United States Patent [19]
Jackson et al.

[11] Patent Number: 5,142,694
[45] Date of Patent: Aug. 25, 1992

[54] REPORTING UNIT

[75] Inventors: Brett A. Jackson, Arlington Heights; Paul A. Kuemmel, Schaumburg; Naresh J. Bhatia, Palatine; Vitaly Lenchik, Hoffman Estates; Paul J. Cizek, Palatine, all of Ill.

[73] Assignee: Motorola, Inc., Schaumburg, Ill.

[21] Appl. No.: 383,830

[22] Filed: Jul. 24, 1989

[51] Int. Cl.$^5$ .................................................. H04Q 7/04
[52] U.S. Cl. ................................. 455/67.1; 340/825.5; 379/63
[58] Field of Search ................. 455/33, 34, 11, 54, 455/56, 38, 67, 58; 379/58–63; 340/825.5, 825.54, 825.06; 364/403

[56] References Cited

U.S. PATENT DOCUMENTS

| | | | |
|---|---|---|---|
| 4,539,706 | 9/1985 | Mears et al. | 455/11 |
| 4,833,701 | 5/1989 | Comroe et al. | 455/33 |

Primary Examiner—Curtis Kuntz
Attorney, Agent, or Firm—Wayne J. Egan

[57] ABSTRACT

A RF reporting system is provided that effectively increases the coverage or serving area from an associated base station site. According to the invention, an RF communication system is arranged with a multiplicity of levels designated 0-n. The RF system has at least one base site designated as level 0 and at least one reporting unit each at levels 1-n. All units that communicate directly with a base site are designated level 1. All units that communicate directly with a level 1 unit are designated level 2. All units that communicate directly with a level 2 unit are designated level 3. This process continues to level n units, which communicate directly with level (n-1) units. With this arrangement, when the base site wishes to communicate with a desired target unit of level k, a path is created from the base site (level 0) to the target unit (level k) via intermediate units of intermediate levels 1, 2, . . . , k-2, k-1. When the target unit wishes to respond to the base site, the same path is used, but in the opposite direction.

4 Claims, 5 Drawing Sheets

| ID G | INBOUND | PATH K Z G W |
|---|---|---|
| GENERIC COMMAND: (GEN CMD MAP=0101) GENERIC POLL ||| 
| TARGET COMMAND: POLL RESPONSE FROM W |||

| ID Z | INBOUND | PATH K Z G W |
|---|---|---|
| GENERIC COMMAND: (GEN CMD MAP=0101) GENERIC POLL |||
| TARGET COMMAND: POLL RESPONSE FROM W |||

| ID K | INBOUND | PATH K Z G W |
|---|---|---|
| GENERIC COMMAND: (GEN CMD MAP=0101) GENERIC POLL |||
| TARGET COMMAND: POLL RESPONSE FROM W |||
| TARGET COMMAND: POLL RESPONSE FROM Z |||

REPORTING UNIT

TECHNICAL FIELD

This invention relates generally to reporting systems and more specifically to reporting systems having remote units that communicate with a central site via radio frequency communications.

BACKGROUND OF THE INVENTION

The prior art generally discloses various systems for remotely monitoring various information or parameters within vending machines, such as inventory changes, alarm conditions, cash receipts, etc., wherein the information may be transmitted to a central site for subsequent analysis.

For instance, Sedam et al. U.S. Pat. No. 4,412,292 (hereinafter "Sedam") discloses such a system for remotely monitoring a vending machine and for automatically transmitting pertinent information to a central computer. While Sedam, FIG. 2, teaches using a telephone line to connect the remote monitor to the computer, Sedam also suggests that a radio means may alternately be used. See Sedam, col. 4, lines 55-62.

Cedrone et al. U.S. Pat. No. 4,766,548 (hereinafter "Cedrone") further discloses such an arrangement, suggesting that a radio link may be used to link the remote monitor device to the central computer. See Cedrone, col. 3, lines 17-21.

In summary, reporting systems using radio frequency communications to link a remote monitoring device to a central computer are suggested in the prior art.

However, there are problems with such arrangements. One problem is how to keep the monitoring devices within RF range of the base station. Since the monitoring devices are typically physically secured to a vending machine, the radio communication link may be degraded, or even destroyed, if the associated vending machine is moved to a different location, or if other factors related to RF propagation change. Thus, with a single base site, the area of communication coverage may be limited.

One suggested approach to this problem has been to provide increased coverage by providing multiple base station sites. However, this is expensive, since additional base station hardware is needed. Also, problems arise when the coverage area from different base sites overlap. In addition, each base station must typically be equipped with its own dedicated telephone line in order to couple to the central computer, therefore increasing monthly network charges from the serving telephone company to provide the extra facility.

As a result, there is a need for an improved reporting system.

SUMMARY OF THE INVENTION

It is an object of the invention to provide an improved reporting system that effectively increases the coverage or serving area from an associated base station site.

It is an object of the invention to reduce the number of base station sites that are required to establish RF communication between base and remote monitoring unit(s) in a reporting system infrastructure.

According to the invention, an RF communication system is arranged with a multiplicity of levels designated zero through n (0-n). The RF system has at least one central or base site designated as level 0 and at least one remote reporting unit at each remaining level 1-n. All units that communicate directly with a base site are designated level 1. All units that communicate directly with a level 1 unit are designated level 2. All units that communicate directly with a level 2 unit are designated level 3. This process continues to the level n units, which communicate directly with level n-1 units.

With this arrangement, when the base site wishes to communicate with a desired target unit of level k, a path is created from the base site (level 0) to the target unit (level k) via intermediate units of intermediate levels 1, 2, . . . , k-2, and k-1. When the target unit wishes to respond to the base site, the same path is used, but in the opposite direction.

BRIEF DESCRIPTION OF THE DRAWINGS

FIGS. 4A-4C and FIGS. 5A-5C show typical messages for the first embodiment.

DETAILED DESCRIPTION OF THE INVENTION

Figure 1:
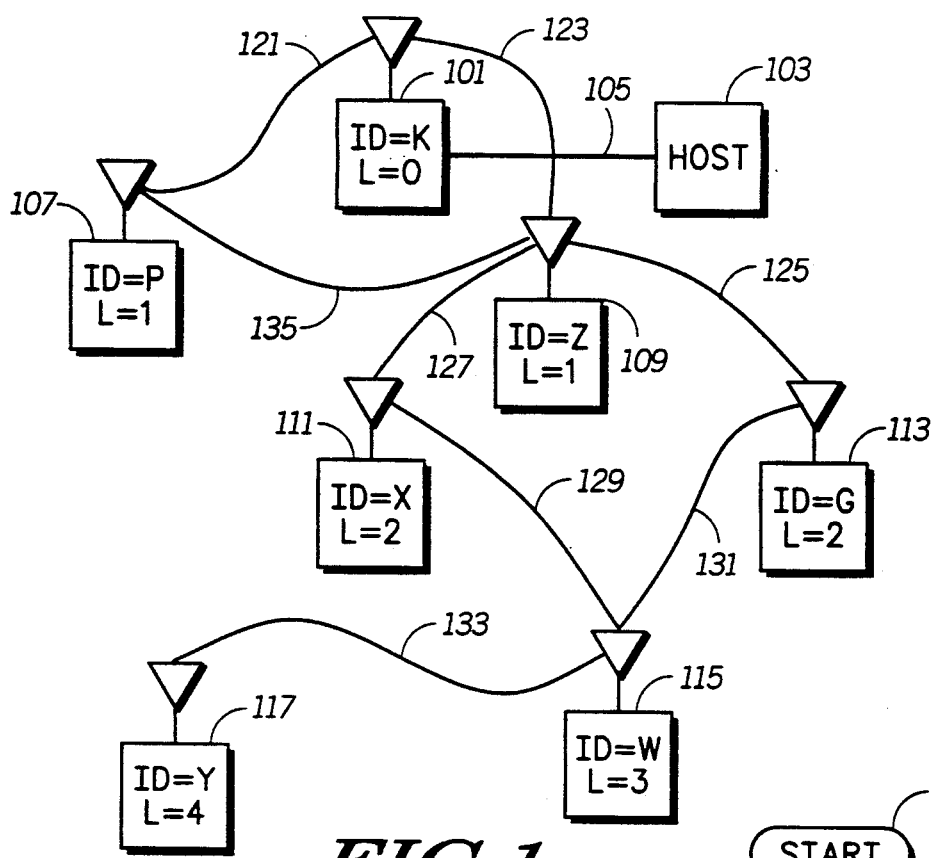
FIG. 1 shows a first embodiment of the reporting system, according to the invention.

FIG. 1 shows a first embodiment of the reporting system, according to the invention. The reporting system consists of one or more base sites, and a plurality of remote units. In FIG. 1, a single base site 101 is shown linked to a host computer 103 by means of a suitable facility 105 of any convenient means such as, for example, a telephone line. Those skilled in the art, however, will appreciate that the host 103 and base site 101 may be co-located. In such a case, facility 105 may be a simple local channel.

Also shown are various remote reporting units. Each unit is assigned a system-wide unique identification code (ID). FIG. 1 depicts the following units, along with their associated IDs in parenthesis: a first unit 107 (P), a second unit 109 (Z), a third unit 111 (X), a fourth unit 113 (G), a fifth unit 115 (W), and a sixth unit 117 (Y). The base site 101, which may also include a co-located reporting unit, also has a unique ID, here K.

Each remote unit, in turn, may be coupled to one or more co-located vending machines (not shown) and arranged to collect desired customer information therefrom. If the base site is equipped with a reporting unit, then it, too, may be arranged to collect data from one or more co-located vending machines. Various mechanisms for monitoring a vending machine are known in the art, and hence no further description of such a device need to be set forth here.

The reporting system, according to the invention, establishes RF communications between remote units and one or more base sites. After successfully establishing RF communication, information can be retrieved from the remote units. The reporting system is also able to verify existing RF communications.

Base site 101 is defined as residing at level zero (0). Remote units that maintain RF communications directly to a base site are configured in the RF network as level one (1) units. Thus, units 107 and 109 are level 1 units, since they communicate directly with base site 101 via RF links 121 and 123, respectively.

Remote units that require one intervening remote unit to establish communication to base site 101 are configured as level two (2) units. Thus, units 111 and 113 are level 2 units, since they communicate with base site 101 via level 1 unit 109. Here units 111 and 113 communicate with unit 109 via RF links 127 and 125, respectively.

In a similar manner, remote units that require more than one intermediate remote unit for RF communications to the base site are configured at level n, where the number of intermediate units is n−1.

In FIG. 1, unit 115 is a level 3 unit since it requires two (2) intermediate units to communicate with the base site 101. As shown, unit 115 may communicate with unit 111 via RF link 129, or else it may communicate with unit 113 via RF link 131. Unit 117 is a level 4 unit since it requires three (3) intermediate units to communicate with the base site 101. As shown, unit 117 communicates with unit 115 via RF link 133.

FIGS. 2A-2D is a flow diagram for a firt configuration method for the first embodiment. As will be seen, upon power-up (or else upon command), a remote unit attempts to configure itself in the system by attempting to establish or verify RF communication directly with a base site (level 0) or, if this is not possible, by attempting to establish communications to a unit having the lowest possible level. This process of negotiating with the system to establish reliable communications with another unit of the lowest possible level (with a base site of level 0 being the lowest and most desirable) is defined herein as the configuration process. A natural outcome resulting from a unit's practicing the configuration process is the unit achieves the lowest possible level for itself.

There are several reasons why a unit may elect to practice this process, thereby configuring itself at a certain level.

One reason is the unit may be a newly-installed unit and, in this case, its level in the system has not been established or determined heretofore.

Another reason a previously-configured unit may wish to engage in the configuration process is that it may have been moved to a new location. In this case, although the unit had a certain level at the previous location, it may now need to re-determine (or re-configure) its level in the system. As we will see, the re-configuration process in this case may ultimately yield a level for the new location numerically equal to the previous level at the previous location. Even if this were the result, however, the re-configuration process for a unit in this situation is still desirable, since it tends to guarantee over-all system performance will be optimum. Stated otherwise, the process tends to guarantee that all communication paths are reliable.

Another reason is a configured unit may have experienced a power failure triggering a memory failure in the unit which, in turn, results in the unit forgetting or losing its configuration information in the system. As a result, it may have to configure itself in order to re-determine its level within the system.

Another reason is the unit may wish to voluntarily re-configure itself from time to time in hopes of up-grading its level in the system. Thus, a level 7 unit may deliberately choose to re-configure itself, in hopes of becoming a level 6 (or lower level) unit. One reason for a unit being able to up-grade its level in the system is that the RF communication climate and/or conditions, may have changed since the prior configuration.

There may, of course, be still other reasons why a unit may wich to configure itself (or re-configure itself) in the system from time to time.

The configuration process is now described.

Figure 2A:
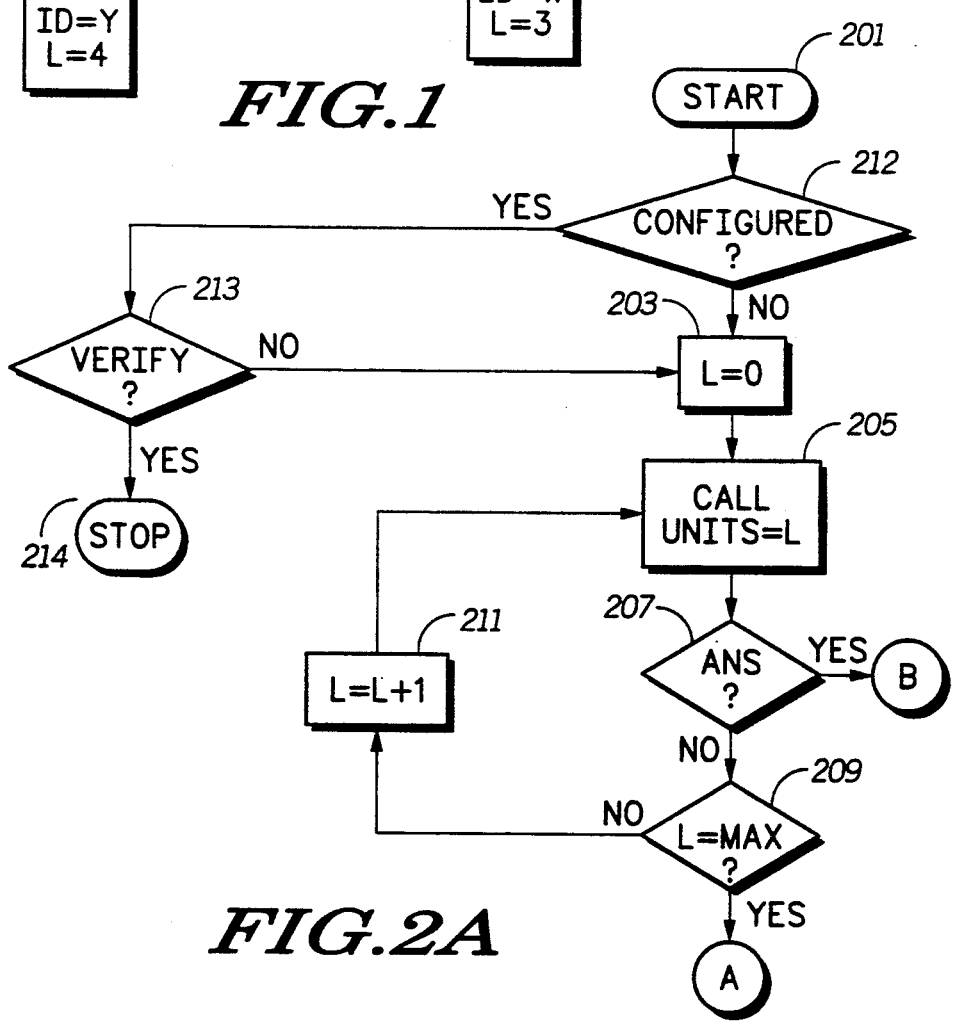
FIGS. 2A-2D is a flow diagram for a first configuration method for the first embodiment.

Referring to FIG. 2A, the process starts at step 201. The unit first determines if it has been previously configured, step 212. If it has, it attempts to verify its configuration with the host computer, step 213. If the unit's configuration is verified, the process is complete, and so it stops, step 214. If the unit has not been previously configured or fails to verify its configuration with the host, then the process sets a parameter designated "Level" equal to 0, step 203. The unit then transmits a message which indicates an unconfigured unit is requesting a response from a base site (Level=0), step 205. This message is transmitted multiple times, with a wait period of time for a response from a base site.

An unsuccessful attempt here causes the unit to attempt to establish communications with other configured units. The unit accomplishes this by transmitting a message requesting a response from any configured level 1 units. This message is transmitted several times, with a wait period of time for a response. If no level 1 remote units respond, then the unconfigured unit increments the level being pursued, until a predetermined maximum level is reached.

In FIG. 2A, the foregoing process corresponds to step 207, where it is determined that no level 0 unit has responded. The process now continues to step 209, which determines whether the current Level is equal to the pre-set maximum level. Assuming the level has not reached the maximum, the process goes to step 211, where the Level is incremented by 1. The process now returns to step 205, where a message is sent to all stations having the current level. If no answer is received, step 207, the process proceeds until step 209 determines the maximum value of Level has been reached.

In response to any particular interrogation at a certain level (step 205), the unit may receive multiple responses from multiple configured units, each of which may have reliable RF communication paths. In this case, the unconfigured unit will store these responding units as multiple parents in its directory. The unconfigured unit (or child) will then select one parent from this group and send a message to this parent indicating that it wishes to configure itself. This message will indicate the parent(s) selected by the child. The child remote unit will remain in the unconfigured state until the central or base site acknowledges receipt of the configuration message and the child's directory. Upon receipt of the acknowledgement, the previously-unconfigured unit is now part of the system in a configured state.

A child waiting for acknowledgement by the central site cannot respond to messages from other unconfigured remote units in the system. The child will wait a predetermined time period for the acknowledgement. If none is received, the child will assume that the selected parent failed to report its state and directory to the base site. The child will then select another parent to complete the task. If the child had only one parent then the unconfigured unit will begin the configuration procedure again.

Figure 2C:
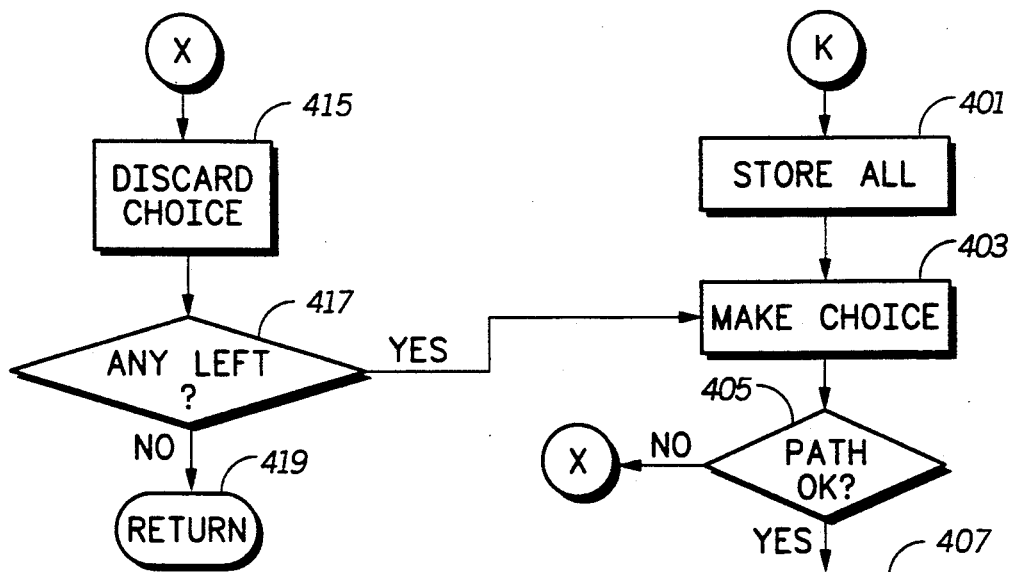
Figure 2B:
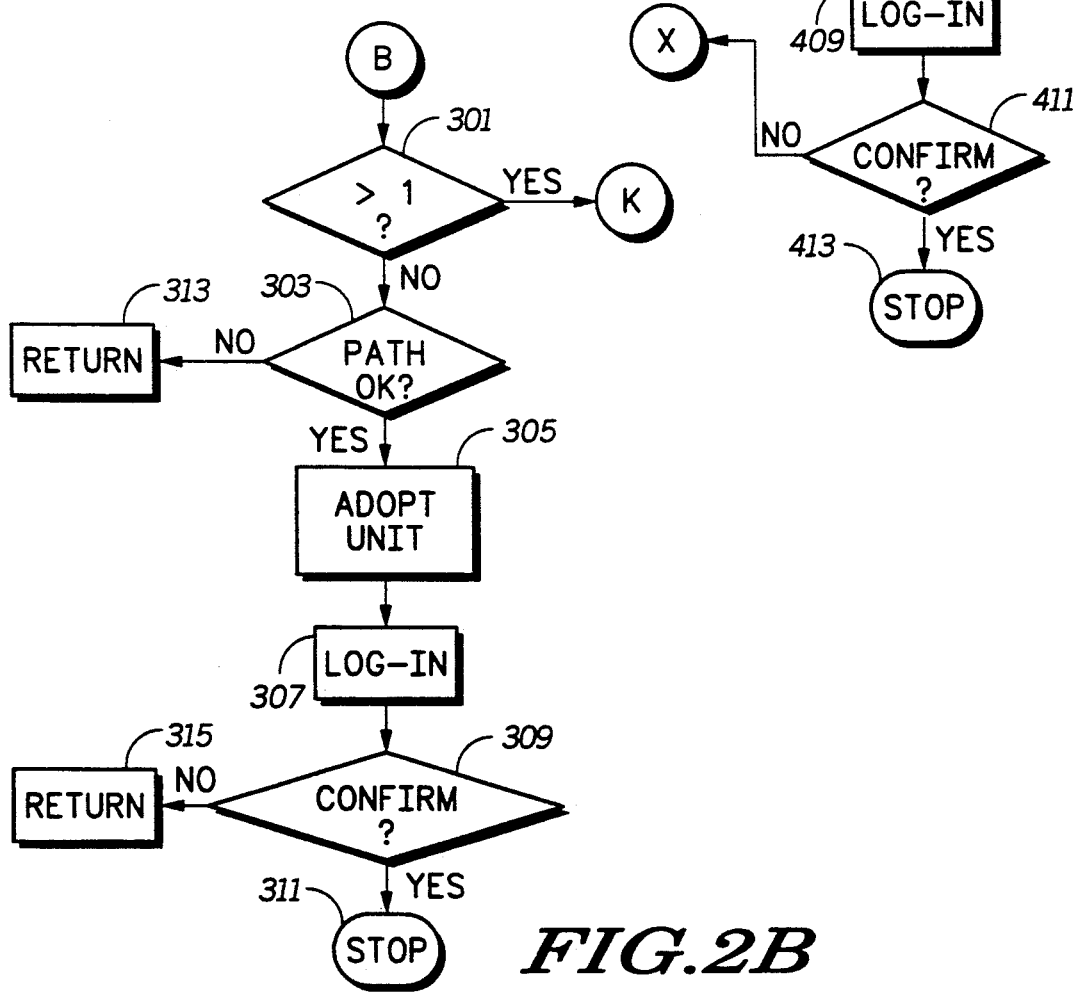

The foregoing process generally corresponds to FIGS. 2B and 2C. In order to comprehend this process fully, however, we must begin with FIG. 2A. If at least one response is received to any particular interrogation at any level (step 205), then the answer to step 207 will be affirmative. The process now goes (via reference letter "B") to step 301 of FIG. 2B.

Referring now to FIG. 2B, step 301 determines whether more than 1 response has been received. If the answer is negative (only 1 response), then the process goes to step 303, where it determines whether the associated RF path is reliable. Those skilled in the art will appreciate that there are many ways to do this. For example, the noise might be measured, and compared against a pre-set threshold limit. Or else the signal quality might be measured. Or else a bit error rate or message error rate may be determined.

If the process determines (step 303) that the path is not reliable, then the process returns (step 313) to the start-up step 201 of FIG. 2A.

If, on the other hand, the process determines (step 303) that the path is reliable, then the unit adopts the responding unit as a parent, step 305. The process attempts to log-in with the host computer system via the network, step 307. The process then proceeds to step 309, where it waits for a predetermined period of time for configuration from the host computer via the network. If this is successful (determination step 309 is affirmative), then the unit is configured, and the process stops, step 311. If this fails (determination step 309 is negative), then the process returns (step 315) to the start-up step 201 of FIG. 2A.

It will be recalled that step 301 of FIG. 2B determines whether more than 1 response has been received. If the answer is positive (more than 1 response), then the process goes to step 401 of FIG. 2C via reference letter "K".

Turning now to FIG. 2C, step 401, the process stores all of the responding units as a group. The process next selects a member unit from the group, step 403. Those skilled in the art will appreciate that this selection may be performed by any convenient algorithm such as, for instance, at random. The process next determines whether the associated RF path is reliable, step 405. If the path is reliable, the process then proceeds to adopt the selected unit as a parent, step 407. (If step 405 determines the path is unreliable, the process goes to step 415 via reference letter "X." Step 415 will be discussed below.) After step 407, the process next attempts to log-in, step 409. The process next determines whether it has received the required confirmation from the host within the required time period, step 411. If it does (affirmative), then the process ceases, step 413.

In the event that step 405 determines that the path is unreliable, or else in the event that step 411 fails to determine timely confirmation from the host, then the process goes to step 415 via reference letter "X." Here the process discards the present choice of parent, thus removing the associated member unit from the group formed and/or stored in step 401. The process next goes to step 417, where it determines whether there is at least one member unit remaining in the group initially formed in step 401. If the answer is affirmative (at least one member left in group), the process returns to step 403, where it proceeds to again make a choice from the group. (Of course, this selection process may be trivial in the event there's only one member remaining in the group.) The process then proceeds as described above.

On the other hand, if the process determines at step 417 that the group is presently empty (there is not at least one member in the group), then the process returns (step 419) to the start-up step 201 of FIG. 2A.

Should the unconfigured unit reach the predetermined maximum level value without successfully configuring itself, it will monitor the RF channel for messages from either a base site or a configured unit. If messages are over-heard or detected, the unconfigured remote unit will transmit a message to the specific unit over-heard (and whose message was detected), requesting a response from that unit. During the configuration procedures, any received response to a message transmitted by an unconfigured unit will establish a potential RF path. Reliability tests are performed on this RF path to insure dependable communications between the unconfigured unit and the responding unit, whether an base site or configured unit. Once the path reliability has been verified, the unconfigured unit will store the parent in its directory, and will attempt to successfully log-in as described above.

Figure 2D:
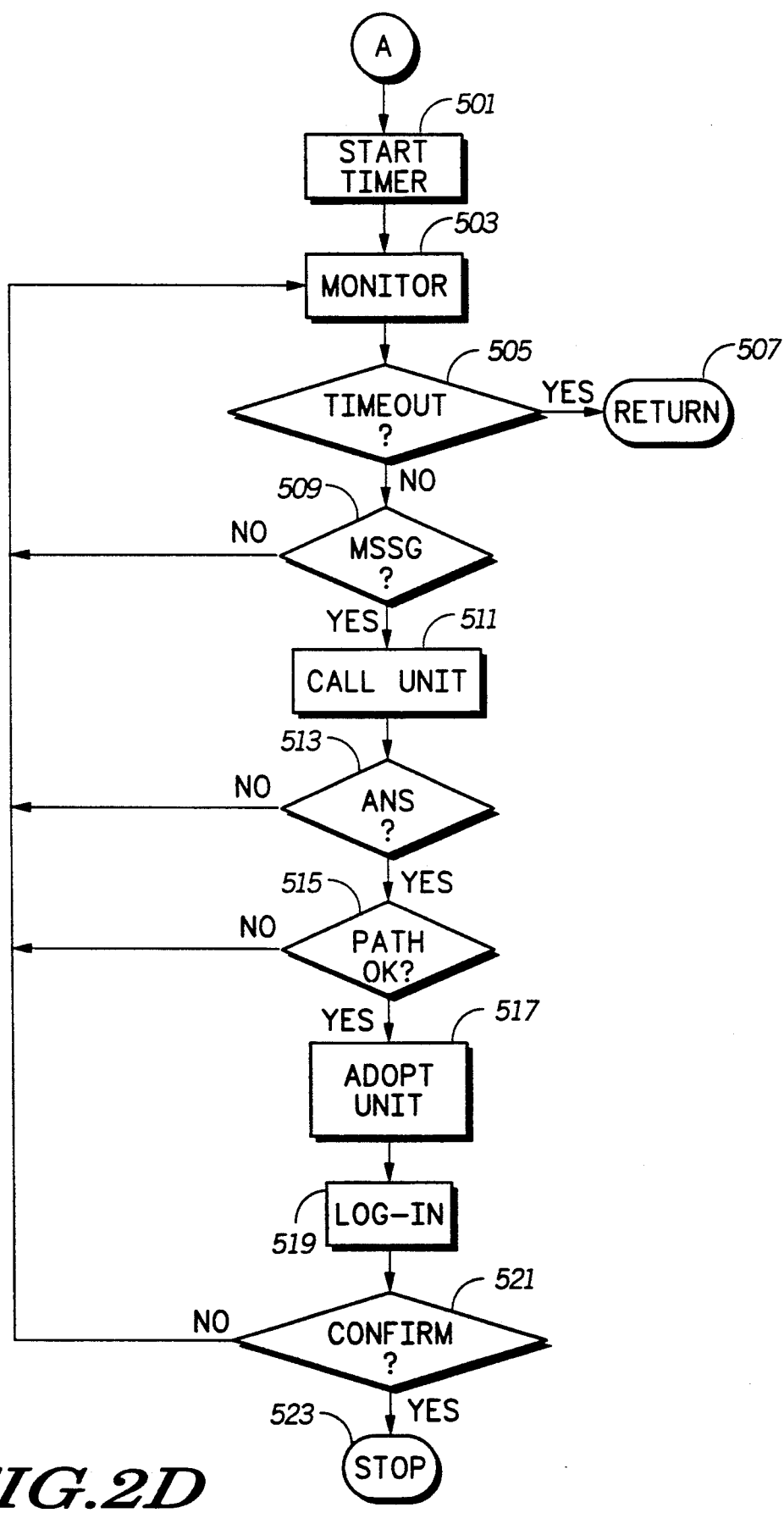

The foregoing process generally corresponds to FIG. 2D. In order to comprehend this process fully, however, we must begin with FIG. 2A. If the pre-set maximum level is achieved, then the answer to step 209 will be affirmative. The process now goes (via reference letter "A") to step 501 of FIG. 2D.

Referring now to FIG. 2D, step 501 first initiates a timer which is arrange to time-out at a predetermined time. The process next monitors (step 503) at least one communication resource (such as, for example, a frequency band or channel or a time-division multiplex (TDM) time slot) for messages that may be transmitted from another unit of any level from level 0 (a base site) to the maximum level allowed, n. It will be appreciated that the system may have more than one communication resource and, therefore, the process may monitor multiple resources. If the timer times out prior to receiving a message (step 505), then the process returns (step 507) to the start-up step 201 of FIG. 2A. If a message is received (step 509), however, then the unit calls the unit (or base site) that transmitted the message, step 511. The unit then waits a predetermined time for an answer from this unit (or base site). If an answer is not received within the required time limit, step 513, then the unit returns to the monitoring step 503.

If a timely answer is received (step 513), however, then the unit proceeds to determine whether the RF path is reliable, step 515. If step 515 determines the path is not reliable, then the unit returns to the monitoring step 503. Otherwise the unit proceeds to adopt the responding unit as a parent, step 517. The unit then attempts to long-in with the host computer via the base site, step 519. The process next proceeds to step 521, where it determines whether it has received a proper and timely confirmation from the host computer. If it has (determination from step 521 is positive), then the process is complete, step 523. If a proper and timely confirmation from the host computer is not received (determination from step 521 is negative), then the unit returns to the monitoring step 503.

Returning now to FIG. 1, a typical system configuration comprises a central computer 103, at least one base unit or base site 101, and at least other unit. Each unit may be classified in the computer by its level which, in turn, corresponds to its RF communications capability to a base site (level 0) or amongst other units of various levels.

Each unit (including each base site) is identified by a unique ID. A unit at level n may store a plurality of IDs of units at level n-1 (its parents) that it can communicate with. This is called the directory of the unit. The directory of units at level 1 will contain one or more base units or base sites. The central computer maintains a copy of the directions of each unit in a network table. The central computer uses the network table to determine the path of communication to any unit in the system. From above, it will be recalled that the units in FIG. 1 have the following IDs:

| Unit: | ID: |
| --- | --- |
| 101 | K |
| 107 | P |
| 109 | Z |
| 111 | X |
| 113 | G |
| 115 | W |
| 117 | Y |

(Those skilled in the art will appreciate that these ID designatins—K, P, Z, X, G, W, and Y—are intended to represent any convenient scheme or format of ID designations. For instance, an alternate scheme might employ a format evidence by the following IDs: 0AAA, 1BBB, 2CCC, 3DDD, etc. Other schemes are, of course possible.)

As stated above, the central computer uses the network table to determine the path of communication to any unit in the system. Thus, in FIG. 1, the path to unit 111 (ID=X) is K, Z, X. Also, the path to unit 113 (ID=G) is K, Z, G. One possible path to unit 115 (ID=W) is K, Z, X, W. Another possible path to unit 115 is K, Z, G, W. One possible path to unit 117 (ID=Y) is K, Z, X, W, Y. Another possible path to unit 117 is K, Z, G. W, Y.

In the case of unit 115 (ID=W), with one possible path being K, Z, G. W, this means that the central computer 103 can send a message targeted to unit 115 (ID=W) via the base site unit 101 (ID=K), and 109 (ID=Z) and unit 113 (ID=G). Of course, given proper directory entries, both inter-level and intra-level communications can take place.

Each message comprises two parts: a header and one or more data and/or command fields or blocks.

Figure 3A:
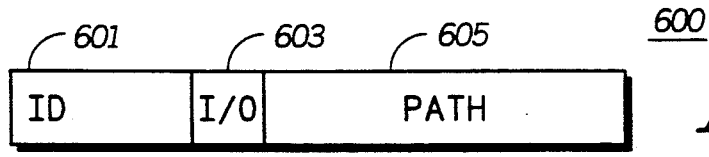
FIGS. 3A-3B show a header format and message format for the first embodiment.

Turning now to FIG. 3A, there is shown a header format 600. As shown, the header 600 comprises three components: the ID (601) of the next unit/base site in the path, a direction bit (outbound "O" or inbound "I") 603, and the message path 605.

Figure 3B:
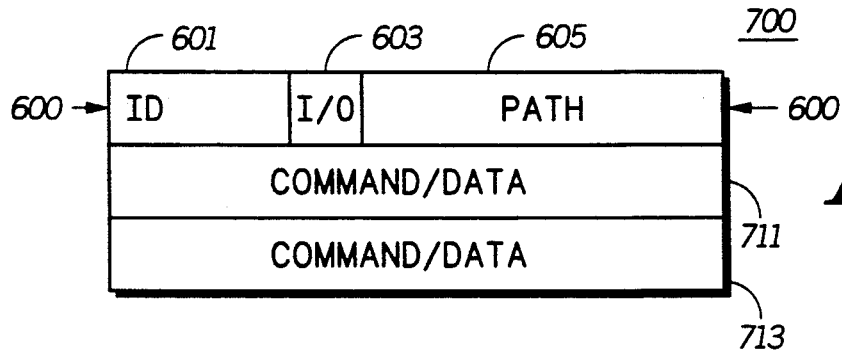

Turning now to FIG. 3B, there is shown a message format 700. As shown, a message 700 consists of a header 600 and one or data and/or command fields or blocks. Here, two command/data fields, 711 and 713, are shown. Some data blocks in the message may be interpreted by some units in the path as commands.

The commands may be divided into two categories; Targeted and Generic. The targeted commands will be executed by the target unit only. The generic commands will be inspected by every unit in the path for possible execution. One possible use of the generic command is to improve RF efficiency by reducing the number of individual targeted polls that need to be sent to units in the network for data collection.

Every generic command has an embedded bitmap, called the Generic Command Map (or "Gen Cmd Map"). This bitmap determines which units in the path should execute the corresponding command. For example, a Generic Command Map=0110 may imply that second and third units in the path (comprising 4 units) must execute the Generic command.

The following section will describe a typical message flow in the first embodiment of FIG. 1. Cross reference will be made to FIGS. 4A-4C and 5A-5C, which depict typical messages.

A typical communication process may be a poll request command initiated by the central computer to retrieve the status information from one or more units. Referring to FIG. 1, consider a situation where the central computer 103 wants to poll units Z 109 and W 115. Here, one possible path=K, Z, G, W. The associated Generic Command Map may be 0101, indicating that the second unit (Z) and the fourth unit (W) in the path must execute the poll command. This task can be achieved in a single outbound message targeted to unit W. This results in the computer 103 directing base site unit K 101 to send an outbound message 800 shown in FIG. 4A to unit Z (109 in FIG. 1) via RF link 123.

Figure 4A:
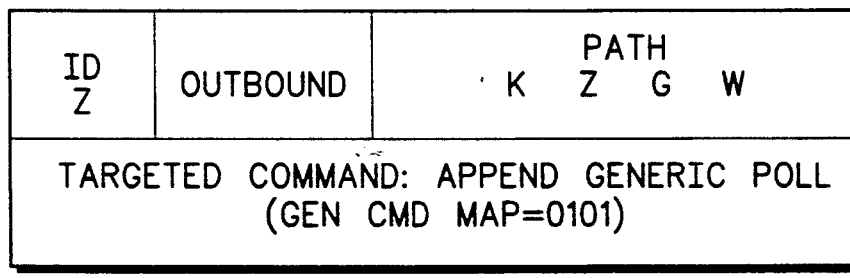

Unit Z (109 in FIG. 1) next receives the message 800 as shown in FIG. 4A and determines that it must relay the message to unit G (113 in FIG. 1). In response, it transmits the message 900 shown in FIG. 4B to unit G (113 in FIG. 1) via RF link 125.

Figure 4B:
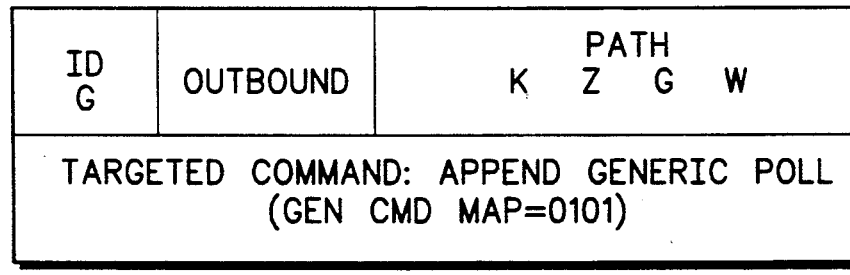

Unit G (113 in FIG. 1) receives the message 900 as shown in FIG. 4B and determines that it must relay the message to unit W (115 in FIG. 1). In response, it transmits the message 1000 shown in FIG. 4C to unit W via RF link 131.

Figure 4C:
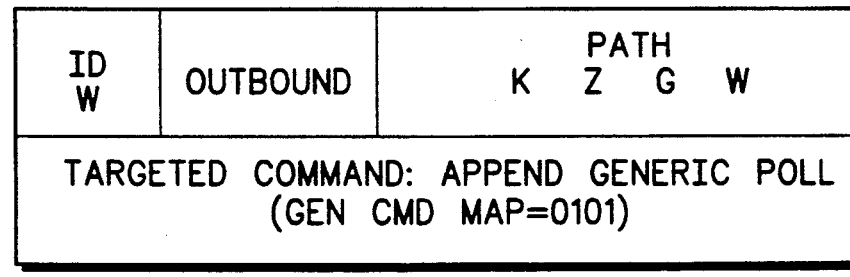

Unit W receives the message 1000 shown in FIG. 4C and determines that the message is destined to itself. In response, unit W prepares a return message. Unit W executes the targeted command from the received message which appends the generic poll command to the return message. Recall the Generic Command Map (0101) indicates that unit W (as well as unit Z) must execute the generic command.

Unit W (115 in FIG. 1) now appends its poll response to the return message and transmits it towards the base site unit K (101 in FIG. 1). Unit W does this by transmitting the message 1100 shown in FIG. 5A to unit G (113 in FIG. 1) via link 131.

Unit G (113 in FIG. 1) next receives the message 1100 shown in FIG. 5A. The Generic Command Map 0101 in the poll command indicates that unit G need not execute the generic command. Therefore, unit G passes the message on to the next unit in the path, Unit G accomplishes this by transmitting the message 1200 shown in FIG. 5B to unit Z (109 in FIG. 1) via link 125.

Unit Z (109 in FIG. 1) next receives the message 1200 shown in FIG. 5B. The Generic Command Map 0101 indicates that unit Z must execute the generic command. Therefore, unit Z appends its poll response to the message and relays the message to base site unit K (101 in FIG. 1). Unit Z accomplishes this by transmitting the message 1300 shown in FIG. 5C to base site unit K via link 123.

The base site unit K (101 in FIG. 1) finally receives the message 1300 shown in FIG. 5C, and passes it on to the central computer 103 via facility 105.

While various embodiments of the reporting system, according to the invention, have been disclosed herein as depicting a given reporting unit (say, for example, at level k) communicating with another unit of an adjacent level (that is, level k plus or minus unity (1)), the applicant notes that units may also be able to communicate with other unit at the same level. Referring to FIG. 1, unit 107 is depicted as being configured as level 1 since it is capable of communicating directly with the base site 101 (defined as level 0), via link 121. However, also as depicted, note that unit 107 is also capable of communicating with unit 109 (also at level 1) via link 135.

Those skilled in the art will appreciate that each reporting unit, as described herein, may comprise an RF transceiver and control mechanism enabling the unit to perform its various functions within the system. The control mechanism may, for example, include a suitably-programmed microprocessor device. The Reporter TM unit, available from Motorola, Inc., 1301 East Algonquin Road, Schaunburg, Ill. 60196, is such a reporting unit. The Reporter TM unit is part of the Vendnet TM system, which system is also available from Motorola, Inc.

While various embodiments of the reporting system, according to the invention, have been disclosed herein, the scope of the invention is defined by the following claims.

What is claimed is:

1. In a radio frequency communications system (FIG. 1) having levels 0 through n, and constructed and arranged to support two-way communications among levels having at least one unit each, units at level n communicating with units at level n-1, and so forth, units at level 1 communicating with units at level 0, each unit having a unique address or identification number ("ID"), and having at least one unit (101) at level 0 that is capable of forming and initiating messages, a method for a predetermined unit in said system (FIG. 1) to transmit a message (700) to another unit, the message (700) comprising a header field (600), the header field (600) comprising:

an address field (601) containing the ID of the presently-addressed unit, a message path field (605) comprising the IDs of all units in the message path, the IDs ordered within the field in accordance with the transmission path of the message, the ID of the unit (101) that initiated the message at the beginning of the field, the ID of the final unit in the message path at the end of the field, and the IDs of all other units in the message path therebetween, and a direction bit (603) indicating the present direction of travel of the message, that is, "O" or outbound indicating the message is currently travelling from the initiating unit (101) towards the final unit in the message path, "I" or inbound indicating the message is currently traveling from the final unit towards the initiating unit (101), the message further containing at least one data/command field (711); the method comprising the steps of:

at said predetermined unit:

(a) receiving a message (700);

(b) based on the value of the direction bit (603) and the contents of the message path field (605), determining the ID of the next unit in the message path;

(c) changing the contents of the address field (601) based on the ID determined in step (b); and (d) transmitting the message (700), revised as above.

2. The method of claim 1 with the following step intermediate between steps (c) and (d):

(c1) when the predetermined unit is the final unit in the message path, then changing the value of the direction bit (603).

3. The mthod of claim 2 with the following steps intermediate between steps (c) and (d):

(c2) examining the contents of the at least one command/data field (711);

(c3) based on the contents, determining when a response is required; and, (c4) when a response is required, then forming a new command/data field (713) and appending it to the message (700).

4. The method of claim 3 wherein the new command/data field (713) is appended to the existing at least one command/data field (711).

* * * * *

UNITED STATES PATENT AND TRADEMARK OFFICE
CERTIFICATE OF CORRECTION

PATENT NO. : 5,142,694

DATED : August 25, 1992

INVENTOR(S) : Brett A. Jackson; Paul A. Kuemmel; Naresh J. Bhatia; Vitaly Lenchik; Paul J. Cizek It is certified that error appears in the above-identified patent and that said Letters Patent is hereby corrected as shown below:

Column 10, line 28, "mthod" should be --method--.

Signed and Sealed this

Sixteenth Day of November, 1993

*Attest:*

BRUCE LEHMAN

*Attesting Officer*     *Commissioner of Patents and Trademarks*